United States Patent [19]

Probst et al.

[11] 4,434,269

[45] Feb. 28, 1984

[54] CATIONIC SIZING AGENT FOR PAPER AND A PROCESS FOR THE PREPARATION THEREOF

[75] Inventors: Joachim Probst, Cologne; Günter Kolb, Leverkusen; Peter Mummenhoff, Cologne; Heinz Bäumgen, Leverkusen, all of Fed. Rep. of Germany

[73] Assignee: Bayer Aktiengesellschaft, Leverkusen, Fed. Rep. of Germany

[21] Appl. No.: 344,991

[22] Filed: Feb. 2, 1982

[30] Foreign Application Priority Data

Feb. 5, 1981 [DE] Fed. Rep. of Germany ....... 3103917

[51] Int. Cl.$^3$ .............................................. C08L 79/00
[52] U.S. Cl. .................................. 524/538; 524/829; 428/514
[58] Field of Search ............... 524/538, 829, 460, 533, 524/376

[56] References Cited

U.S. PATENT DOCUMENTS

| | | | |
|---|---|---|---|
| 2,808,388 | 10/1957 | Hellmann | 524/460 |
| 3,941,727 | 3/1976 | Timmerman et al. | 524/460 |
| 4,166,882 | 9/1979 | Das et al. | 524/829 |
| 4,337,185 | 6/1982 | Wessling et al. | 524/460 |

FOREIGN PATENT DOCUMENTS 1218862 1/1971 Fed. Rep. of Germany .
1593802 7/1981 Japan .

OTHER PUBLICATIONS

"Characteristics of Fine Particles", Chemical Engineering, Jun. 11, 1962 p. 207.

*Primary Examiner*—Joseph L. Schofer
*Assistant Examiner*—N. Sarofim
*Attorney, Agent, or Firm*—Connolly and Hutz

[57] ABSTRACT

Cationic sizing agents for paper in the form of an aqueous colloid-disperse solution having average particle diameters of from 15 to 200 nm are obtained by dissolving a water-soluble cationic, chemically uniformaly composed terpolymer compound of:
  (a) from 7 to 40% by weight of N,N-dimethylaminoethyl acrylate and/or methacrylate,
  (b) from 45 to 80% by weight of styrene, and
  (c) from 4 to 40% by weight of acrylonitrile in an aqueous medium, the total of components (a) to (c) always amounting to 100% by weight and at least 10% of the N,N-dimethylamino groups of the terpolymer being quaternized and the rest being protonated, and by emulsifying, in the presence of from 10 to 70% by weight, based on the following monomer mixture, of this emulsifier,
  (d) acrylonitrile or methacrylonitrile in quantities of from 5 to 95% by weight, with
  (e) $C_1$–$C_{12}$-alkyl esters of acrylic acid and/or of methacrylic acid in quantities of from 5 to 95% by weight, the total of components (d) and (e) amounting to 100% by weight, and by subjecting the emulsion thus obtained to a radically initiated emulsion polymerization process at temperatures of from 20° to 150° C.

6 Claims, No Drawings

CATIONIC SIZING AGENT FOR PAPER AND A PROCESS FOR THE PREPARATION THEREOF

This invention relates to aqueous, colloid-disperse paper sizing agents based on copolymers of acrylonitrile or methacrylonitrile and acrylates or methacrylates which have been polymerised in the presence, as emulsifiers, of quaternised terpolymers, composed in a chemically uniform manner, of N,N-dimethylaminoethyl (meth)acrylate, styrene and acrylonitrile.

It is known (see German Offenlegungsschrift No. 1,621,688) that cationic paper sizing agents can be prepared by mixing the aqueous solution of a polycation, which is present in salt form and is based on maleic acid anhydride, and other comonomers with an aqueous emulsion homopolymer or emulsion copolymer. However, the mixtures thus prepared are generally unstable and they tend to deposit sediment which has a disturbing effect during paper production, because this may, among other things, result in an inhomogeneous sizing of the paper.

German Offenlegungsschrift No. 2,814,527 describes the preparation of a sizing agent for paper which is prepared from N,N-dimethylaminoalkyl (meth)acrylate and substituted or unsubstituted styrene, in the presence of a polymeric cationic emulsifier quaternised with epihalogenhydrin, optionally with the addition of an auxiliary emulsifier of the following formula:

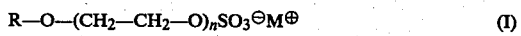

$$R\text{—}O\text{—}(CH_2\text{—}CH_2\text{—}O)_n SO_3^{\ominus} M^{\oplus} \qquad (I)$$

wherein
R represents a higher aliphatic or cycloaliphatic hydrocarbon radical,
$M^{\oplus}$ represents a monovalent metal cation or ammonium, and
n represents an integer $\geq 2$.

Hydrophobic monomers, such as styrene, styrene derivatives, acrylates and/or methacrylates, are polymerised in an aqueous medium in the presence of these polymeric emulsifiers. In a preferred embodiment, a mixture of 23.5% by weight of dimethylaminoethyl methacrylate and 76.5% by weight of styrene is polymerised in isopropanol. The mixture is then acidified with acetic acid, dissolved in water and thereafter quaternised with epichlorohydrin at a temperature of from 80° to 85° C. The emulsifiable polycation thus prepared is then used for the aqueous emulsion polymerisation of a mixture of styrene and 2-ethylhexyl acrylate (weight ratio of 3:1), the weight ratio of the emulsifier to the monomer mixture being 1:2. A compound (1) where $M=NH_4$ is used as the anionic auxiliary dispersing agent and aqueous hydrogen peroxide is used as the initiator. The polymers which are obtained thus are optically cloudy dispersions, but are nevertheless relatively stable. However, if it is required to reduce the content of basic monomers in the polymeric cationic emulsifier component to 20% by weight and less, the dispersions very rapidly become more coarsely divided, more unstable and they tend towards polymer precipitation. The polymer deposits which occur mostly entail a considerable deterioration in the sizing effect and result in disturbances in the working procedure during paper production.

It has now been found that stable, colloid-disperse, mostly transparent solutions are obtained when acrylonitrile or methacrylonitrile is polymerised with acrylates or methacrylates in the presence or specific polymeric cationic emulsifiers in an aqueous system. These emulsifiers are quaternisation products of chemically very uniformly composed terpolymers of N,N-dimethylaminoethyl (meth)acrylate, styrene and acrylonitrile containing at the most 40% by weight of basic comonomer.

The paper sizing agent according to the present invention in the form of a colloid-disperse solution having average particle diameters of from 15 to 200 nm is obtained by dissolving a water-soluble cationic, chemically uniformly composed terpolymer compound consisting of the following:
(a) from 7 to 40% by weight, preferably from 8 to 20% by weight, of N,N-dimethylaminoethylacrylate and/or methacrylate,
(b) from 45 to 80% by weight of styrene, and
(c) from 4 to 40% by weight, preferably from 5 to 35% by weight, of acrylonitrile in an aqueous medium, the total of components (a) to (c) always amounting to 100% by weight and at least 10% of the N,N-dimethylamino groups of the terpolymer being quaternised and the rest being protonated; emulsifying, in the presence of from 10 to 70% by weight, based on the following monomer mixture, of this emulsifier, (d) acrylonitrile or methacrylonitrile in quantities of from 5 to 95% by weight, preferably from 10 to 90% by weight, with (e) $C_1$-$C_{12}$-alkyl esters of acrylic acid and/or of methacrylic acid in quantities of from 5 to 95% by weight, preferably from 10 to 90% by weight, the total of components (d) and (e) amounting to 100% by weight; and subjecting the emulsion thus obtained to a radically initiated emulsion polymerisation process at temperatures of from 20° to 150° C.

The weight ratio between the polymeric, cationic emulsifier and the monomer mixture of (d) and (e) is preferably from 1:4 to 1:1 respectively.

The paper sizing agent according to the present invention is also obtained by using, in addition to the cationic emulsifier mentioned, a cationic and/or non-ionic auxiliary emulsifier in quantities of from 1 to 40% by weight, preferably from 3 to 20% by weight, based on the above-mentioned cationic emulsifier, the non-ionogenic emulsifier corresponding to the following formula:

$$R_1\text{—}X\text{—}(CH_2\text{—}CH_2\text{—}O)_n\text{—}H \qquad (II)$$

wherein
X represents O, NH or COO,
$R_1$ represents a higher aliphatic, cycloaliphatic, araliphatic or aromatic hydrocarbon radical having from 6 to 30 carbon atoms, and
n is an integer $\geq 2$ and the cationic auxiliary emulsifier corresponding to the following formula:

wherein
$R_2$ and $R_3$ represent higher aliphatic or araliphatic hydrocarbon radicals having from 6 to 20 carbon atoms,
$R_4$ and $R_5$ represent lower aliphatic hydrocarbon radicals having from 1 to 6 carbon atoms, and
$Y^{\ominus}$ represents a halide ion.

The chemically very uniformly composed terpolymer of N,N-dimethylaminoethyl (meth)acrylate, styrene and acrylonitrile is quaternised in an organic medium before acids are added, epihalogenhydrins being preferred as reactive quaternising agents. The acid is then added and the mixture is dissolved to form aqueous solutions having a concentration of from 10 to 30% by weight, preferably from 15 to 25% by weight. The emulsifier solutions thus obtained may now be freed by distillation from the organic solvent; however, it is unnecessary to remove the organic solvent, because it does not generally disturb the further reaction course of the emulsion polymerisation process.

It is sufficient for the emulsifying process to use the quaternised cationic terpolymers without further additives for the emulsion polymerisation process. However, it has proved to be most favourable in some cases to use oligomeric non-ionogenic and/or low-molecular-weight cationic auxiliary emulsifiers in quantity ratios of from 1 to 40% by weight, preferably from 3 to 20% by weight, based on the cationic emulsifier, together with the polymeric cationic emulsifier.

The reaction products of aliphatic, araliphatic, cycloaliphatic or aromatic carboxylic acids, alcohols, phenol derivatives or amines with epoxides, for example ethylene oxide, are suitable as non-ionogenic auxiliary emulsifiers.

Examples are reaction products of ethylene oxide with carboxylic acids, for example, lauric acid, stearic acid, oleic acid, the carboxylic acids of castor oil, and abietic acid, with longer-chain alcohols such as oleyl alcohol, lauryl alcohol, stearyl alcohol, with phenol derivatives, for example, substituted benzyl- or phenyl phenols, nonylphenol and with longer-chain amines such as dodecylamine and stearylamine. The reaction products with ethylene oxide are oligo- or polyethers having polymerisation degrees of from 2 to 100, preferably from 5 to 50.

Quaternised ammonium salts, for example, benzyldodecyl-dimethyl-ammonium chloride are suitable as cationic, low-molecular-weight auxiliary emulsifiers. The auxiliary emulsifiers mentioned effect an additional emulsification of the monomer mixture and, in some cases, an increase in stability of the colloid-disperse sizing agents. However, it is not advisable to use too great a quantity of these auxiliary dispersing agents, because an undesirable foaming action may then easily occur.

Those compounds which form with acrylonitrile or methacrylonitrile copolymers having film formation temperatures of below 100° C. are preferably suitable as acrylates or methacrylates which are used with acrylonitrile or methacrylonitrile in the radical emulsion copolymerisation process.

Copolymers which have higher film formation temperatures due to the level of their glass transition temperature have an unsatisfactory sizing effect. In principle, acrylates, such as methyl, ethyl, n-butyl and 2-ethylhexyl acrylate and methacrylates such as methyl methacrylate and n-butyl methacrylate are suitable. They may be copolymerised singly or in mixtures with acrylonitriles or methacrylonitrile. The content of acrylonitrile or methacrylonitrile may be from 5 to 95% by weight, preferably from 10 to 90% by weight. Too little (meth)acrylonitrile in the copolymer may disturb paper production owing to the tackiness thereof; the sizing of the paper is inadequate where too much (meth)acrylonitrile is used.

The following are preferably included as initiators for the emulsion polymerisation process: water-soluble, radical-producing, non-ionogenic peroxides, such as hydrogen peroxide and t-butyl-hydroperoxide and water-soluble azo compounds, as described, for example, in German Offenlegungsschrift No. 2,841,045. Redox systems are also suitable which consist of peroxidic initiators and reducing agents such as amines, polyamines, thiourea and iron-(II)-salts etc. Water-insoluble initiators, such as azoisobutyronitrile and benzoyl peroxide are also included as initiators. The latter are then practically only dissolved in the organic phase. The initiators mentioned are added in quantities of from 0.1 to 5% by weight, preferably from 0.3 to 3.0% by weight, based on the monomer mixture.

In order to regulate the molecular weight of the polymers, conventional regulators may also be used, e.g. n-dodecylmercaptan, diisopropyl xanthogen disulphide, thioglycol and thioglycerin. They are added in quantities of from 0.1 to 2% by weight, based on the monomer mixture.

The emulsion polymerisation process in an aqueous medium may be carried out according to known polymerisation processes in batches or continuously or in a feed process. The continuous and feed processes are particularly preferred. In the latter, water together with some or all of the emulsifier system and optionally some of the monomer mixture is introduced under a nitrogen atmosphere, heated to the polymerisation temperature of from 20° to 150° C., preferably from 50° to 100° C., and the monomer mixture and the initiator and optionally the emulsifier are added dropwise over a period of from 0.5 to 10 hours, preferably from 1 to 6 hours.

After a while, the mixture is subsequently activated and the reaction is completed up to a conversion of approximately from 99.0% to 99.9% by weight. The weight ratio of emulsifier to polymer is from 1:9 to 7:3, preferably from 1:4 to 1:1. Residual monomers and organic solvent which may still be present are removed by distillation under vacuum subsequently to the emulsion copolymerisation process. Enough water is then added until an approximately from 10 to 30% by weight aqueous colloid-disperse solution is obtained. The viscosity of these dispersions, measured in a rotating viscosimeter at 20° C., is generally below 50 mPa.s. The average particle diameters measured by laser light scattering spectroscopy are, depending on the reaction conditions, from 15 to 200 nm, preferably from 20 to 150 nm. Dispersions having particle sizes smaller than 50 nm appear transparent, whereas those having larger particles are more cloudy. The stability of dispersions having particle sizes below 100 nm is also better than that of dispersions having particles sizes below 100 nm. This may be demonstrated, for example, by thermal strain at temperatures of about 50° C. The proportion of sediments in more coarsely divided dispersions is mostly considerably greater than in finely divided dispersions.

However, if emulsion polymerisation processes according to German Offenlegungsschrift No. 2,814,527 are carried out with cationic dispersing agents, in which the content of basic comonomers is at the most 20% by weight, relatively unstable, coarsely divided dispersions are produced having average particle sizes of from 200 to 300 nm.

The stability of the colloid-disperse sizing agents according to the present invention is also increased by quantities of polymer grafted on the polymeric emulsifier which is present in relatively large quantities. Graft reactions of this type which are initiated by transfer reactions by the emulsifier are known in the literature (see H. Gerrens, Fortschritte der Hochpolymer-Forschung, Volume I, (1959) page 300).

The paper sizing agents according to the present invention may be used according to all working methods conventional in paper production for surface and mass sizing.

The substantial pH independence of the sizing effect, the low tendency towards deposits in the form of sediments and the low foaming tendency are advantages compared to sizing agents according to German Offenlegungsschrift No. 1,621,688 of a relatively unstable mixture of a cationic latex with a polycation based on styrene and maleic acid anhydried. The very stable, transparent or only slightly cloudy colloid-disperse solutions of the cationic paper sizing agents according to the present invention are easily processed in contrast to the unstable dispersions according to the above-mentioned German Offenlegungsschrift. The sizing agent solutions according to the present invention guarantee absolute homogeneity of the sized paper and show on practically all paper a good to outstanding sizing effect, the sizing of aluminium sulphate-free paper in particular being emphasized. The outstanding sizing of paper containing chalk is particularly mentioned.

EXAMPLE 1

Preparation of the cationic emulsifiers 5720 g of isopropanol are introduced into a 40 l stirrer-equipped autoclave. The autoclave is flushed thoroughly with nitrogen and is then heated to 80° C. At this temperature, the mixtures 1 and the solutions II of Table 1 are metered in over a period of approximately 4 hours with the exclusion of air. The mixture is then stirred for 1 to 2 hours and is thereafter subsequently activated using III. It is then stirred for about 6 to 12 hours at 80° C.

After the terpolymerisation process, the mixture is cooled to 40° C. or 50° C. and the quantities stated in Table 1 of quaternised agents (IV) are metered in. The mixture is then stirred for 1 to 5 hours at 40° or 50° C. and is then mixed with the quantities of acetic acid also stated in Table I. About 63 to 65 liters of deionised water at a temperature of approximately 60° C. are introduced into a 120 liter stock vessel which is equipped with a stirrer and the contents of the 40 liter autoclave are combined therewith.

A homogeneous aqueous solution is prepared within in short time with intensive stirring. The aqueous solutions which still contain organic solvent have the characteristics which are also specified in Table I.

TABLE I

| Emulsifier | | A | B | C | D |
|---|---|---|---|---|---|
| Polymerisation temperature (° C.) | | 80 | 80 | 80 | |
| Temperature during the reaction with epichlorohydrin (°C.) | | 40 | 40 | 50 | 50 |
| I. | N,N—dimethylaminoethyl methacrylate (g) | 3217 | 2257 | 3217 | 3217 |
| | Styrene (g) | 10224 | 10608 | 10224 | 10224 |
| | Acrylonitrile (g) | 2644 | 3219 | 2644 | 2644 |
| II. | Azoisobutyronitrile (g) | 530 | 600 | 590 | 590 |
| | Acetone (g) | 3000 | 3000 | 3000 | 3000 |
| III. | Azoisobutyronitrile (g) | 75 | 75 | 71 | 71 |
| | Acetone (g) | 300 | 300 | 300 | 300 |
| IV. | Epichlorohydrin (g) | 1896 | 1330 | — | — |
| | Chloroacetic acid ethyl ester (g) | — | — | 1887 | — |

TABLE I-continued

| Emulsifier | | A | B | C | D |
|---|---|---|---|---|---|
| | p-toluene sulphonic acid methyl ester (g) | — | — | — | 1235 |
| V. | Acetic acid (g) | 2630 | 2630 | 2370 | 2370 |
| | Concentration (% by weight) | 20.5 | 20.3 | 20.7 | 20.1 |
| | Viscosity (at 20° C.) (mPa.s)(+) | 50–70 | 880–1200 | — | — |
| | pH value | 3.9 | 3.8 | 3.0 | 2.9 |
| | Conversion based on the monomer mixture (% by weight) | 99.8 | 99.7 | 99.5 | 99.6 |
| | Appearance of the emulsifier solution | clear | clear | clear | clear |

(+)The viscosity is not a constant, because structural viscosity is present.

EXAMPLES 2 TO 4

350 g of deionised water are introduced into a 2 l four-necked flask equipped with a stirrer, a reflux cooler and a gas inlet and outlet. The water is then thoroughly boiled under a nitrogen atmosphere and cooled to 70° C. The emulsions I (see Table 2) are then added to the starting solution and nitrogen is passed over. 0.5 g of a 35% hydrogen peroxide solution is then added. After about 15 to 30 minutes, the mixtures II and 6 g of a 35% hydrogen peroxide solution which is diluted with 100 g of deionised water are metered in simultaneously over a period of from 2 to 3 hours. The mixture is then stirred for 2 to 5 hours, subsequently activated using from 1 to 2 g of hydrogen peroxide solution (35%) and subsequently polymerised for about 2 to 10 hours. About 50 to 150 ml of a mixture of water, organic solvent (isopropanol and acetone) and residual monomers is then distilled off under a water jet vacuum and is replaced by from 50 to 150 ml of deionised water. The physical-chemical characteristics of the colloid-disperse solutions thus obtained are also shown in Table II.

TABLE II

| Example | | 2 | 3 | 4 |
|---|---|---|---|---|
| I. | Emulsifier A (see Tab. I) (g) | 500 | 500 | 500 |
| | Acrylonitrile (g) | 3.0 | 5.0 | 7.0 |
| | Acrylic acid-n-butyl ester (g) | 7.0 | 5.0 | 3.0 |
| II. | Acrylonitrile (g) | 57.0 | 95.0 | 133.0 |
| | Acrylic acid-n-butyl ester (g) | 133.0 | 95.0 | 57.0 |
| | Concentration (% by weight) | 26.4 | 26.6 | 26.7 |
| | Viscosity (at 20° C.) (mPa.s.) | <50 | <50 | <50 |
| | pH value | 4.1 | 4.1 | 4.2 |
| | Conversion, based on the monomer mixture before distillation (% by weight) | ~99.8 | ~99.6 | ~99.7 |
| | Appearance of the colloid-disperse solution | transparent | transparent | transparent |
| | Average particle diameter $d_z$ (nm) | 30 ± 3 | 32 ± 2 | 29 ± 2 |

EXAMPLES 5 AND 6

The colloid-disperse sizing agents 5 and 6 are prepared in the same manner as the corresponding sizing agents 3 and 4, but emulsifier A is replaced by emulsifier B (see Table I). As may be seen in Table III, the physical-chemical characteristics of the colloid-disperse solutions are the same as those of Examples 2 to 4.

TABLE III

| Example | | 5 | 6 |
|---|---|---|---|
| I. | Emulsifier B (see Table 1) (g) | 500 | 500 |
| | Acrylonitrile (g) | 5.0 | 7.0 |

TABLE III-continued

| Example | | 5 | 6 |
|---|---|---|---|
| | Acrylic acid-n-butyl ester (g) | 5.0 | 3.0 |
| II. | Acrylonitrile (g) | 95.0 | 133.0 |
| | Acrylic acid-n-butyl ester (g) | 95.0 | 57.0 |
| | Concentration (% by weight) | 25.2 | 25.6 |
| | Viscosity (at 20° C.) (mPa.s.) | <50 | <50 |
| | pH value | 4.0 | 4.0 |
| | Conversion, based on the monomer mixture before distillation (% by weight) | ~99.7 | ~99.8 |
| | Appearance of the colloid-disperse solution | transparent | transparent |

EXAMPLES 7 TO 9

The colloid-disperse sizing agents 7 to 9 are prepared in the same manner as the sizing agents 2 to 4, emulsifier A being retained, but acrylic acid-n-butyl ester is replaced by acrylic acid-2-ethylhexyl ester. Table IV lists the compositions of the monomer mixtures and the physical-chemical characteristics of the colloidal sizing agents.

TABLE IV

| Example | | 7 | 8 | 9 |
|---|---|---|---|---|
| I. | Emulsifier A (see Table I) (g) | 500 | 500 | 500 |
| | Acrylonitrile (g) | 7.0 | 5.0 | 3.0 |
| | Acrylic acid-2-ethyl-hexyl ester (g) | 3.0 | 5.0 | 7.0 |
| II. | Acrylonitrile (g) | 133.0 | 95.0 | 57.0 |
| | Acrylic acid-2-ethyl-hexyl ester (g) | 57.0 | 95.0 | 133.0 |
| | Concentration (% by weight) | 24.6 | 25.2 | 25.7 |
| | Viscosity (at 20° C.) (mPa.s.) | <50 | <50 | <50 |
| | pH value | 4.1 | 4.0 | 4.0 |
| | Conversion, based on the monomer mixture before distillation (% by weight) | ~99.6 | ~99.7 | ~99.6 |
| | Appearance of the colloid-disperse solution | transparent | practically transparent very slightly cloudy | slightly cloudy |
| | Average particle diameter $d_z$ (nm) | 25 ± 2 | 35 ± 3 | 38 ± 3 |

EXAMPLES 10 AND 11

The colloid-disperse sizing agents 10 and 11 are prepared in the same manner as the sizing agents 2 to 4, but emulsifier A is replaced by the emulsifiers C and D (see Table I) in the quantities specified in Table V. Table V lists the physical-chemical characteristics of the paper sizing agents in addition to the monomer mixtures.

TABLE V

| Example | | 10 | 11 |
|---|---|---|---|
| I. | Emulsifier C (g) | 500 | — |
| | Emulsifier D (g) | — | 500 |
| | Acrylonitrile (g) | 5.0 | 5.0 |
| | Acrylic acid-n-butyl ester (g) | 5.0 | 5.0 |
| II. | Acrylonitrile (g) | 95.0 | 95.0 |
| | Acrylic acid-n-butyl ester (g) | 95.0 | 95.0 |
| | Concentration (% by weight) | 25.9 | 25.5 |
| | Viscosity (at 20° C.) (mPa.s.) | 50 | 50 |
| | pH value | 3.3 | 3.5 |
| | Appearance of the colloid-disperse solution | slightly cloudy | slightly cloudy |

EXAMPLES 12 AND 13

(with auxiliary emulsifiers) 400 g of deionised water are introduced into a 2 l four-necked flask provided with a reflux cooler, a stirrer and a gas inlet and outlet, and are thoroughly boiled under a nitrogen atmosphere. The water is then cooled to 70° C. and mixture 1 (see Table VI) is metered in. After thoroughly flushing with nitrogen, 0.5 g of a 35% by weight hydrogen peroxide solution are added. After a further 15 minutes, the mixtures II and III are metered in proportionately over a period of 2 hours. The mixture is then stirred for 3 hours at 70° C., is then mixed with 1 g of hydrogen peroxide solution (35%) and is subsequently stirred for 3 hours. 50 ml of solvent and residual monomers are then distilled off in a water jet vacuum and are replaced by 50 ml of deionised water. The physical-chemical data of the sizing agents are listed in Table VI.

TABLE VI

| Example | | 12 | 13 |
|---|---|---|---|
| I. | Emulsifier A (g) | 500 | 500 |
| | Auxiliary emulsifier E(+) (g) | 10 | — |
| | Auxiliary emulsifier F(++) (g) | — | 10 |
| | Acrylonitrile (g) | 5.0 | 5.0 |
| | Acrylic acid-n-butyl ester (g) | 5.0 | 5.0 |
| II. | Acrylonitrile (g) | 95 | 95 |
| | Acrylic acid-n-butyl ester (g) | 95 | 95 |
| III. | Hydrogen peroxide (35%) (g) | 6.0 | 6.0 |
| | Deionised water (g) | 100 | 100 |
| | Concentration (% by weight) | 26.0 | 25.0 |
| | Viscosity (at 20° C.) (mPa.s.) | <20 | <20 |
| | pH value | 4.4 | 4.0 |
| | Appearance of the colloid-disperse solution | practically transparent | practically transparent |
| | Average particle diameter (nm) | 42 | 45 |

Note on Table VI
(+)Auxilliary emulsifier E: Reaction product of benzylphenylphenol with a polyether containing hydroxyl groups derived from ethylene oxide.
(++)Auxilliary emulsifier F: Reaction product of abietic acid with a polyether containing hydroxyl groups derived from ethylene oxide.

EXAMPLE 14 (COMPARATIVE EXAMPLE)

Preparation of the emulsifiers G and H according to German Offenlegungsschrift No. 2,814,527

50 g of isopropanol are introduced into a one liter four-necked flask flushed with nitrogen and provided with a stirrer, a reflux cooler and a gas inlet and outlet. Nitrogen is passed over and the isopropanol is heated to 80° C. The mixtures I (see Table VII) are then metered in over a period of approximately 3 hours. The mixture is then stirred for one hour and is subsequently activated using II. Thereupon, it is subsequently stirred for 6 hours at 80° C. and III is then added. If the aqueous solution is homogeneous, IV is metered in at 80° C. and the mixture is subsequently stirred for 3 hours. The concentrations of the emulsifier solutions are specified in Table VII.

Preparation of the emulsion preparations 400 g of deionised water which has been boiled are introduced into a 2 l four-necked flask rinsed with nitrogen and provided with a stirrer, a reflux cooler and a gas inlet and outlet, are adjusted to a temperature of 70° C. and V and VI are then added (see Table VIIa). After a nuclei formation phase of 15 minutes, the mixtures VII and VIII are simultaneously metered in over a period of 2 hours. The mixture is then stirred at 70° C., subsequently activated with IX and completely polymerised up to conversions of more than 99%. Residual monomers and organic solvent are removed by distillation in a water jet vacuum and are replaced by salt-free water. The physical-chemical characteristics of the resulting emulsion polymers are also listed in Table VIIa.

TABLE VII

| Emulsifier | | G | H |
|---|---|---|---|
| I. | N,N—Dimethhylaminoethyl methacrylate (g) | 32.9 | 22.4 |
| | Styrene (g) | 107.1 | 117.6 |
| | Azoisobutyronitrile (g) | 5.0 | 5.0 |
| II. | Azoisobutyronitrile (g) | 0.5 | 0.5 |
| III. | Acetic acid (g) | 12.6 | 8.6 |
| | Deionised water (g) | 650 | 650 |
| IV. | Epichlorohydrin (g) | 19.4 | 13.2 |
| | Concentration (% by weight) | 20.2 | 19.3 |

TABLE VIIa

| Comparative Example | | | |
|---|---|---|---|
| V. | Emulsifier solution G (g) | 500 | — |
| | Emulsifier solution H (g) | — | 500 |
| | Acrylonitrile (g) | 5.0 | 5.0 |
| | Acrylic acid-n-butyl ester (g) | 5.0 | 5.0 |
| VI. | Hydrogen peroxide solution (35%) (g) | 0.5 | 0.5 |
| VII. | Acrylonitrile (g) | 95.0 | 95.0 |
| | Acrylic acid-n-butyl ester (g) | 95.0 | 95.0 |
| VIII. | Hydrogen peroxide solution (35%) (g) | 6.0 | 6.0 |
| | Deionised water (g) | 100 | 100 |
| IX. | Hydrogen peroxide solution (35%) (g) | 1.0 | 1.0 |
| | Concentration (% by weight) | 24.2 | 25.2 |
| | Viscosity (at 20° C.) (mPa.s.) | <50 | <50 |
| | pH value | 4.4 | 4.4 |
| | Appearance | very cloudy | very cloudy |
| | Average particle diameter (nm) | 260 | 264 |

It is shown by the Comparative Example that the emulsifiers according to German Offenlegungsschrift No. 2,814,527 are unsuitable for the emulsion copolymerisation process of acrylonitrile and acrylic acid-n-butyl ester. This is due to the fact that, because of its chemical inhomogeneity, the emulsifier is itself an aqueous partial dispersion, in which some of the polymer is dissolved, while the rest is present in a colloid-disperse form.

The Comparative Example thus results in cloudy emulsions having particle sizes of 260 and 264 nm, respectively. After a short time, agglomerates are deposited on the base of the container and these may severely disturb the paper sizing and the paper production process. The sizing of the paper itself is also impaired in these coarsely-disperse systems.

A solution of 5% by weight of starch (perfectamyl TM A4692 produced by ABEBE) and 0.20 and 0.24% by weight respectively of the sizing agent to be tested (calculated as active substance) in 94.80 and 94.76% by weight respectively of water is used as a sizing liquor for the surface sizing.

A laboratory sizing press produced by Werner Mathis, Zürich, Type HF is used for sizing. The sizing liquor is at a temperature of approximately 20° C. in the sizing press. The paper is drawn through at a rate of 4 m/minute.

The surface-sized papers are dried on a dry cylinder over a period of approximately 45 seconds at approximately 100° C. The papers are acclimatized for 2 hours at room temperature before the sizing test. Sections of the papers are then pre-weighed, immersed for 1 minute in water at 20° C., squeezed out once between filter paper using a 10 kg roller weight and then reweighed.

USE EXAMPLE 1

This Example demonstrates the good efficiency of some sizing agents on aluminium sulphate-free paper.

The base paper used has the following composition and characteristics: 50% by weight of softwood pulp, 50% by weight of hardwood pulp; 9.5% by weight of clay ash, pH value in the pulp feed: 7.5; wet absorption in the laboratory sizing press: about 80% by weight, paper weight: 80 g/m².

TABLE VIII

| Surface sizing on aluminium sulphate-free paper | | |
|---|---|---|
| | Water absorption in g/m² with the addition of | |
| Sizing agent of Example: | 0.20% by weight | 0.24% by weight of sizing agent (based on pure active substance) to the liquor: |
| 3 | 33.2 | 32.4 |
| 5 | 34.1 | 33.1 |
| 7 | 33.2 | |
| 8 | 31.8 | |
| 9 | 32.6 | |
| 10 | 34.5 | 33.7 |
| 13 | 32.0 | 31.5 |

The water absorption is 89.0 g/m² without sizing agent.

USE EXAMPLE 2

This Example demonstrates the good efficiency of some sizing agents on paper containing mechanical wood pulp.

The composition and characteristics of this paper was as follows: 40% by weight of softwood pulp, 60% by weight of mechanical wood pulp; 14.1% by weight of clay ash; 2% by weight of aluminium sulphate; pH value in the pulp feed: 4.5; wet absorption: about 60% by weight; paper weight: about 80 g/cm².

TABLE IX

| Surface sizing on paper containing mechanical wood pulp | | |
|---|---|---|
| | Water absorption in g/m² with the addition of | |
| Sizing agent of Example: | 0.20% by weight | 0.24% by weight of sizing agent (based on pure active substance) to the liquor: |
| 3 | 31.8 | 28.4 |
| 5 | 30.5 | 27.5 |
| 7 | 31.3 | |
| 8 | 27.8 | |
| 9 | 27.7 | |
| 10 | 31.9 | 29.7 |
| 13 | 27.7 | 27.4 |

The water absorption is 93.5 g/m² without sizing agent.

USE EXAMPLE 3

This Example demonstrates the good effect of the sizing agents described on paper containing calcium carbonate.

Composition and characteristics of this paper: 50% by weight of softwood pulp, 50% by weight of hardwood pulp; 7.9% by weight of chalk ash, pH value in the pulp feed: 7.5; wet absorption: about 80% by weight; paper weight: 75 g/m².

TABLE X

| Surface sizing on paper containing calcium carbonate | | |
|---|---|---|
| | Water absorption in g/m² with the addition of | |
| Sizing agent Example | 0.20% by weight | 0.24% by weight of sizing agent (based on pure active substance) to the liquor: |
| 3 | 37.1 | 33.8 |
| 5 | 36.5 | 33.4 |

TABLE X-continued

Surface sizing on paper containing calcium carbonate

| Sizing agent Example | Water absorption in g/m² with the addition of | |
|---|---|---|
| | 0.20% by weight | 0.24% by weight of |
| | sizing agent (based on pure active substance) to the liquor: | |
| 7 | 36.2 | |
| 8 | 36.7 | |
| 9 | 36.9 | |
| 10 | 37.5 | 35.4 |
| 13 | 34.5 | 34.0 |

The water absorption is 78.7 g/m² without sizing agent.

USE EXAMPLE 4 (COMPARATIVE EXAMPLE)

In this Example, the sizing agents of Examples 3, 5 and 8 are compared with a cationic sizing agent according to German Offenlegungsschrift No. 1,621,688 (sizing agent K) with respect to their pH-independent sizing effect.

For this purpose, the base paper described in Use Example 1 is used. The bilateral water absorption is again measured with both the self-adjusting pH (pH from 5.9 to 6.2) as well as with a pH of 8.0. The sizing degree is measured upon adding 0.20% by weight of active substance to the liquor (with K 0.25% by weight).

TABLE XI

Surface sizing depending on the pH of the liquor compared to sizing agent K.

| Sizing agent: | Water absorption in g/m² at | |
|---|---|---|
| | pH 5.9–6.2 | pH 8.0 |
| K | 32.1 | 56.0 |
| Example 3 | 33.2 | 33.0 |
| Example 5 | 34.1 | 33.5 |
| Example 8 | 31.8 | 30.9 |

It is clearly shown by this Table that the sizing effect of the sizing according to the present invention is also completely maintained even at a pH of 8.0, whereas the prior art sizing agent only exhibits a slight sizing effect.

USE EXAMPLE 5

This Example demonstrates the usability of the sizing agents described in the paper pulp.

From 0.25 to 0.60% by weight of sizing agent (active substance based on dry woodpulp) are added with stirring to a pulp of 50% by weight of bleached birch pulp, 50% by weight of bleached pine pulp and 25% of chalk charge (grinding degrees 35° SR), with a pulp density of 0.5% by weight and a pH of 7.2.

Sheets of paper are then immediately formed on a laboratory sheet former and are dried at 100° C. and they have a basis weight of about 80 g/m².

The sizing effect is determined by the bilateral water absorption and by the time it takes ink to penetrate the sheets (test ink according to DIN 53 126).

For comparison, the cationic "sizing agent K" is again used (see Use Example 4).

TABLE XII

Comparison of the sizing agent of Example 3 with sizing agent K upon introduction into the paper pulp

| Sizing agent: | | Water absorption (WA) in g/m² and penetration of ink (TD) in min. upon adding | | | | |
|---|---|---|---|---|---|---|
| | | 0.25 | 0.30 | 0.35 | 0.50 | 0.60 % by weight of sizing agent (based on active substance) to the pulp |
| K | WA | | | 77 | 58 | 45 |
| | TD | | | 1 | 5 | 10 |
| 2 | WA | 73 | 55 | 41.6 | | |
| | TD | 10 | 16 | 23 | | |

The water absorption is 90.5 g/m² without sizing agent.

We claim:

1. Cationic sizing agents for paper in the form of an aqueous colloid-disperse solution having average particle diameters of from 15 to below 50 nm, said agent being prepared by dissolving a water-soluble cationic, chemically uniformly composed terpolymer compound of:
   (a) from 7 to 40% by weight of N,N-dimethylaminoethyl acrylate and/or methacrylate,
   (b) from 45 to 80% by weight of styrene, and
   (c) from 4 to 40% by weight of acrylonitrile in an aqueous medium, the total of components (a) to (c) always amounting to 100% by weight and at least 10% of the N,N-dimethylamino groups of the terpolymer being quaternised and the rest being protonated, and emulsifying in the presence of from 10 to 70% by weight, based on the following monomer mixture, of this emulsifier,
   (d) acrylonitrile or methacrylonitrile, in quantities of from 5 to 95% by weight, with
   (e) $C_1$-$C_{12}$-alkyl esters of acrylic acid and/or of methacrylic acid in quantities of from 5 to 95% by weight, the total of components (d) and (e) amounting to 100% by weight, and subjecting the emulsion thus obtained to a radically initiated emulsion polymerisation process at temperatures of from 20° to 150° C.

2. Sizing agents for paper according to claim 1, comprising the cationic, chemically uniformly composed terpolymer compound consisting of:
   (a) from 8 to 20% by weight of N,N-dimethylaminoethyl acrylate and/or methacrylate,
   (b) from 45 to 80% by weight of styrene, and
   (c) from 5 to 35% by weight of acrylonitrile, the total of components (a) to (c) always amounting to 100% by weight, and the monomer mixture consisting of (d) acrylonitrile or methacrylonitrile in quantities of from 10 to 90% by weight and (e) acrylic acid esters and/or methacrylic acid esters in quantities of from 10 to 90% by weight, the total of components (d) and (e) amounting to 100% by weight.

3. Sizing agents for paper according to claim 1, comprising using in addition to the polymeric cationic emulsifier according to claim 1, a cationic and/or non-ionic auxiliary emulsifier in quantities of from 1 to 40% by weight, based on the above-mentioned cationic emulsifier, the non-ionogenic emulsifier corresponding to the following formula:

$$R_1-X-(CH_2-CH_2-O)_n-H$$

wherein
X represents O, NH or COO,

R₁ is a higher aliphatic, cycloaliphatic, araliphatic or aromatic hydrocarbon radical having from 6 to 30 carbon atoms, and n is an integer $\geq 2$ and the cationic auxiliary emulsifier corresponding to the following formula:

wherein

R₂ and R₃ represent higher aliphatic or araliphatic hydrocarbon radicals having from 6 to 20 carbon atoms, R₄ and R₅ represent lower aliphatic hydrocarbon radicals having from 1 to 6 carbon atoms, and Y⊖ represents a halide ion.

4. Sizing agents according to claim 1, comprising the weight ratio between the polymeric cationic emulsifier and the monomer mixture of (d) and (e) being from 1:4 to 1:1.

5. Sizing agents according to claim 1, comprising initiating the emulsion polymerisation process by using water-soluble, radical-producing non-ionogenic peroxides and/or azo compounds, optionally as a redox system, in quantities of from 0.1 to 5% by weight, based on the monomer mixture.

6. A process for the preparation of cationic sizing agents, in the form of an aqueous colloid-disperse solution having average particle diameters of from 15 to below 50 nm, comprising dissolving a water-soluble cationic, chemically uniformly composed terpolymer compound of:
  (a) from 7 to 40% by weight of N,N-dimethylaminoethyl acrylate and/or methacrylate,
  (b) from 45 to 80% by weight of styrene, and
  (c) from 4 to 40% by weight of acrylonitrile in an aqueous medium, the total of components (a) to (c) always amounting to 100% by weight and at least 10% of the N,N-dimethylamino groups of the terpolymer being quaternised and the rest being protonated, and emulsifying in the presence of from 10 to 70% by weight, based on the following monomer mixture, of this emulsifier,
  (d) acrylonitrile or methacrylonitrile, in quantities of from 5 to 95% by weight, with
  (e) C₁-C₁₂-alkyl esters of acrylic acid and/or of methacrylic acid in quantities of from 5 to 95% by weight, the total of (d) and (e) amounting to 100% by weight, and subjecting the emulsion thus obtained to a radically initiated emulsion polymerisation process at temperatures of from 20° to 150° C.

* * * * *